United States Patent [19]

Thomas

[11] 3,971,675

[45] July 27, 1976

[54] NONFUMING SOLDERING FLUX

[75] Inventor: Robert C. Thomas, Midland, Mich.

[73] Assignee: The Dow Chemical Company, Midland, Mich.

[22] Filed: July 1, 1974

[21] Appl. No.: 484,526

Related U.S. Application Data

[63] Continuation of Ser. No. 286,167, Sept. 5, 1972, abandoned.

[52] U.S. Cl. ................................................. 148/26
[51] Int. Cl.² ........................................ B23K 35/34
[58] Field of Search ..................................... 148/26

[56] References Cited

UNITED STATES PATENTS

| | | | |
|---|---|---|---|
| 2,867,037 | 1/1969 | Lawton | 148/26 |
| 3,816,188 | 6/1974 | Chay | 148/26 |

*Primary Examiner*—Peter D. Rosenberg
*Attorney, Agent, or Firm*—R. W. Selby; J. M. Kuszaj

[57] ABSTRACT

A new nonfuming, soldering and brazing flux particularly useful in soldering aluminum surfaces which comprises a mixture of zinc bromide and an alkali metal bromide such as potassium bromide.

5 Claims, No Drawings

NONFUMING SOLDERING FLUX

CROSS REFERENCE TO RELATED APPLICATION

This is a continuation of application Ser. No. 286,167, filed Sept. 5, 1972, and now abandoned.

BACKGROUND OF THE INVENTION

The present invention relates broadly to the manufacture of soldering fluxes. More specifically, the invention relates to a substantially nonfuming soldering and brazing flux usable on aluminum.

The development of soldering flux has received much effort and attention over the last 50 years. This is due to the extensive number of desired qualities including (1) a melting temperature slightly below that of the filler metal for which the flux is designed, (2) satisfactory oxide cleaning and removal ability, (3) minimum gas production, (4) minimum corrosion of metals contacted, (5) easy removal, and (6) low cost.

Many materials have been suggested, all with some drawbacks. For aluminum, alkali and alkali earth chlorides and fluorides are usually used — sometimes containing additions of ammonium fluoride or cryolite. The fluorides greatly speed the oxide removal, but are quite corrosive of the metal contacted and release toxic, corrosive fumes. Further, additions of fluoride raise a mixture's melting point.

The chlorides are slower than fluorides in oxide removal. The chlorides also are somewhat corrosive of the metals contacted. Ammonium chloride, often utilized, becomes a strong acid in aqueous solution and attacks the metal surfaces. Also, upon exposure and storage, ammonium chloride becomes more acidic.

Zinc chloride is a primary constituent in many fluxes, but it deposits fused residues around the joint, causing severe corrosion unless removed which can be difficult. Also the fumes released are potentially dangerous.

Hydrohalogen salts of organic bases are noncorrosive but have relatively poor fluxing action and sinter into an unusable mass if over-heated. Rosin leaves a lacquerlike residue and exhibits little solvent or slagging action on metal oxides.

Edson, et al. (U.S. Pat. No. 2,674,791) used inorganic bromides and iodides in compounds of molecular weight greater than 250 with at least two halide atoms bound to the inorganic metal atoms. Battle (U.S. Pat. No. 2,978,369) used hydrobromic acid in conjunction with ammonium or substituted ammonium halides. Simpelaar (U.S. Pat. No. 3,301,688) presented a liquid binding composition of a zinc halide, a solvent, and a fluxing salt selected from a variety of ammonium and sodium halides and alkali fluorides.

SUMMARY OF THE INVENTION

The present invention is a flux composition comprising a mixture of zinc bromide and an alkali metal bromide. Such flux has desirable characteristics, particularly freedom from fuming and from depositing corrosive residue.

DESCRIPTION OF A PREFERRED EMBODIMENT

The flux is operable with constituents $ZnBr_2$ and $MBr$ where M = sodium, potassium, or lithium. The choice of the bromine system yields $AlBr_3$ as the reaction product. It is more stable than the $AlCl_3$ formed in the chlorine system.

The aluminum bromide formed by the reaction of zinc bromide with aluminum is immediately complexed by the alkali metal bromide, for example potassium bromide. Therefore there are no free bromine fumes. The aluminum bromide-potassium bromide complex is much less corrosive than previously used chloride and fluoride fluxes.

Potassium bromide is the preferred alkali metal bromide because the $ZnBr_2$-$KBr$ system has a lower melting point than the systems based on $NaBr$ or $LiBr$.

The constituents can be in solid mixture or in aqueous organic or inorganic solutions or pastes. An equal molar mixture is preferred.

Additional compounds such as potassium acid fluoride and alkali metal chlorides can be admixed with the $ZnBr$ - alkali metal bromide flux.

Flux is used to promote or accelerate the wetting of metals with solder. Metals to be soldered, particularly aluminum, should be precleaned. Aluminum can be cleaned by the following process:

1. immerse in a 5 weight percent NaOH solution at 65°C. for 30 sec.
2. rinse with water.
3. immerse in concentrated $HNO_3$ at room temperature for 1 minute.
4. rinse with hot water and dry.

After cleaning, the metal surfaces to be soldered are put into physical contact with each other. Flux is applied to the surface areas to be soldered. Solder is then placed on the area to be bound. The whole combination is heated until the solder melts and flows, the flux having melted first. A flux of equimolar combination of $ZnBr_2$ and $KBr$ melts at 215°C.

EXAMPLES

Actual tests were run by heating the flux and solder together on an aluminum coupon to a specified temperature and then observing the solder flow. In each of the four examples, the solder was composed of 63% lead, 34% tin, and 3% zinc. The coupon size was 1 × 2 × ⅛ inch. Cleaning was performed by the above suggested method. The temperature was 450°C. Pertinent observations were noted; Table I summarizes the above examples.

TABLE I

| Example | KBr Wt.-g | KBr mole % | $ZnBr_2$ Wt.-g | $ZnBr_2$ mole % | $KHF_2$ Wt.-g | $KHF_2$ mole % | Mixing | Solder Flow | Observed Fuming |
|---|---|---|---|---|---|---|---|---|---|
| 1 | 11.90 | 66 | 11.26 | 34 | — | — | Solid Mixture | Good | None |
| 2 | 5.95 | 50 | 11.26 | 50 | — | — | Solid Mixture | Good | Little |
| 3 | 5.95 | 50 | 11.26 | 50 | — | — | Aqueous Solution | Good | Very Little |
| 4 | 11.90 | 65 | 11.26 | 32 | 0.32 | 3 | Solid Mixture | Good | None |

Further testing of the $ZnBr_2$—$KRr$ system disclosed an additional advantage over the chlorine system. Table II discloses the results obtained with different flux systems, solders and alloys. Solder X is a solder composed of 63% lead, 34% tin, and 3% zinc, melting at approximately 190°C. Solder Y is a solder composed of 95% zinc and 5% aluminum, melting at about 382°C. Aluminum alloy 1100 is 99+% aluminum melting at about 646° to 657°C. Aluminum alloy 3003 is about 98.8% aluminum and about 1.2% manganese, melting at about 646° to 654°C.

In the following tests, aluminum coupons 1 × 1/8 × 1½–3 inches were cleaned by the procedure suggested above for cleaning aluminum. Metal coupons of identical size were treated with equal weights of flux. Equal weights of solder were then added and the coupons set on a hot plate at a specified temperature for a specified time. After cooling the area of solder spread was observed visually. If the solder flowed, the test was "passed." If the solder did not flow, the test was "failed."

Not only is the all bromine system less corrosive than the all chlorine system, but also the ZnBr$_2$-KBr mixture induced flow of solder Y on both aluminum alloys 1100 and 3003 whereas the ZnCl$_2$-KCl mixture failed to induce flow on either alloy.

TABLE II

| Ex. No. | Mole Ratios of Flux Components | | | | | Flux Application Method | Solder | Alloy | Results |
| --- | --- | --- | --- | --- | --- | --- | --- | --- | --- |
| | ZnCl$_2$ | KCl | ZnBr$_2$ | KBr | NaBr | | | | |
| 5 | — | — | 1.00 | 1.12 | — | H$_2$O solution, 75% solids | Y | 1100 | Pass |
| 6 | — | — | 1.00 | 1.12 | — | H$_2$O solution, 75% solids | Y | 3003 | Pass |
| A (Comparative) | 1.00 | 1.12 | — | — | — | H$_2$O solution, 70% solids | Y | 1100 | Fail |
| B (Comparative) | 1.00 | 1.12 | — | — | — | H$_2$O solution, 70% solids | Y | 3003 | Fail |
| 7 | — | — | 1.00 | 1.12 | — | H$_2$O solution, 75% solids | X | 1100 | Pass |
| 8 | — | — | 1.00 | 1.12 | — | H$_2$O solution, 75% solids | X | 3003 | Pass |
| C (Comparative) | 1.00 | 1.12 | — | — | — | H$_2$O solution, 70% solids | X | 1100 | Pass |
| D (Comparative) | 1.00 | 1.12 | — | — | — | H$_2$O solution, 70% solids | X | 3003 | Pass |
| 9 | — | — | 1.00 | 1.00 | — | Applied as dry solids | X | — | Pass |
| 10 | — | — | 1.00 | 1.00 | — | Applied as dry solids | Y | — | Pass |
| 11 | — | — | 1.00 | — | 1.00 | Applied as dry solids | X | — | Pass |
| 12 | — | — | 1.00 | — | 1.00 | Applid as dry solids | Y | — | Pass |

What is claimed is:

1. A substantially nonfuming solder flux consisting of zinc bromide and an alkali metal bromide selected from the group consisting of sodium, potassium or lithium bromide, wherein the alkali metal bromide is present in an amount from about 50 to about 70 mole percent.

2. The flux composition of claim 1 where the alkali metal bromide is potassium bromide.

3. The flux composition of claim 1 where the alkali metal bromide is sodium bromide.

4. The composition of claim 1 wherein said flux is present in an aqueous solution.

5. A substantially nonfuming solder flux consisting of an equimolar mixture of zinc bromide and an alkali metal bromide selected from the group consisting of sodium, potassium or lithium bromides, the solder flux characterized by a melting temperature of 215°C.

* * * * *

UNITED STATES PATENT AND TRADEMARK OFFICE
CERTIFICATE OF CORRECTION

PATENT NO. : 3,971,675
DATED : July 27, 1976
INVENTOR(S) : Robert C. Thomas

It is certified that error appears in the above-identified patent and that said Letters Patent are hereby corrected as shown below:

Column 2, line 33, delete the period "." at the end of the line.

Column 2, line 35, delete the period "." at the end of the line.

Column 2, third line from the bottom, delete "KRr" and insert --KBr--.

Table 2, example 12, under column headed "Flux Application Method", delete "Applid" and insert --Applied--.

Signed and Sealed this

Twenty-third Day of November 1976

[SEAL]

Attest:

RUTH C. MASON
Attesting Officer

C. MARSHALL DANN
Commissioner of Patents and Trademarks